United States Patent Office 3,376,242
Patented Apr. 2, 1968

3,376,242
POLYESTERS DERIVED FROM ADIPIC ACID-ISO-PHTHALIC ACID MIXTURES AS PLASTICIZERS FOR VINYL HALIDE POLYMERS
David Henry Clemens, Willow Grove, Pa., assignor to Rohm & Haas Company, Philadelphia, Pa., a corporation of Delaware
No Drawing. Original application Sept. 23, 1963, Ser. No. 310,932. Divided and this application Oct. 15, 1965, Ser. No. 496,653
6 Claims. (Cl. 260—22)

This application is a division of my earlier application, Ser. No. 310,932, filed Sept. 23, 1963, now abandoned.

This invention deals with a polyester of the formula

in which:
T is at least one saturated fatty acid having an average carbon atom content of 12 to 18 carbon atoms,
G is 1,2-propylene glycol or 1,3-butylene glycol or mixtures of these glycols,
A is a mixture of dibasic acids comprising adipic acid and isophthalic acid in a ratio ranging from 85:60 and 15:40, respectively, and
$n$ is an integer from 7 to 12.

In accordance with the invention, T may represent any one or more fatty acids. The acids may be used singly or in a mixture thereof. The acid is generally a saturated fatty acid. However, small amounts such as about not more than 10 mole percent of the fatty acid, or of the fatty acid mixture, may be an unsaturated fatty acid. Generally, the fatty acids have a carbon atom content ranging as an average from 12 to 18 carbon atoms. Thus, the fatty acid may be partially or full saturated the unsaturation being taken up with hydrogen atoms or other groups, such as epoxides, acyloxy substituents and the like. Typical fatty acids include lauric, myristic, palmitic and stearic. Typical unsaturated fatty acids include oleic, ricinoleic, petroselinic,, linoleic, linolenic, eleostearic, parinaric, erucic, and similar others. These acids are obtainable from common animal or vegetable sources. These fatty acids may be in mixtures with other fatty acids having a carbon atom content higher than 18 such as arachidic, cerotic, behenic, and other fatty acids of a lower carbon atom content than 12 such as capric. A preferred mixture of terminating acids is one comprising lauric and myristic acids.

G is a single glycol like 1,2-propylene glycol or 1,3-butylene glycol or there may be used a mixture of these two glycols. The preferred glycol is 1,2-propylene glycol.

A is a mixture of dibasic acids comprising adipic and isophthalic acids. Adipic acid is present in a mixture in a range from 85 to 60% and isophthalic acid is present in a mixture in a range from 15 to 40%. In accordance with the invention, $n$, the number of repeating units of the polyester, ranges from 7 to 12. Fractional numbers for the $n$ value from 7 to 12 may occur when mixtures of polyesters of varying $n$ values are used to make the final polyester or when fractional amounts of reactants are used.

The particular $n$ value of the polyester, in conjunction with the particular aromatic dibasic acid selected, the isophthalic acid, and the particular ratio of adipic acid to isophthalic acid all contribute in an unexpected manner to bring about a polyester of unexpected beneficial properties.

The polyesters of the invention are useful plasticizers for synthetic resins, in particular for polyvinyl chloride resins. They yield supple and pliable polyvinyl films. They exhibit good permanence in the polyvinyl resin and they also combine a very good resistance to spew at high humidity and a very good resistance to migration into polystyrene. Thus the polyesters of the invention may be used to plasticize polyvinyl chloride resins which are expected to be exposed and in contact with polystyrene with a minimum marring thereof combined with excellent resistance to spew at high temperature.

The polyesters of the invention may be prepared by any suitable method known in the art. A suitable method may be illustrated by reference to specific materials. It comprises reacting 1,2-propylene glycol, the mixture of dibasic acids, adipic and isophthalic acids, in a desired ratio, and a suitable terminating acid. The ratio of dibasic acid to the terminating acid, or mixture of acids, is suitably adjusted in order to obtain an $n$ value in the desired range from about 7 to about 12. n-Moles of the dibasic acid mixture are used for each $n+1$ moles of glycol and 2 moles of the terminating acid mixture or individual fatty acids. For optimum reaction, it is advisable to use an excess of glycol such as 10% to 100%. It is very desirable that the hydroxyl number be below 10, and preferably that it not exceed 7. Preferably, the acid number should not exceed 1. The reaction between the desired reactants is initiated by heating at atmospheric pressure at a temperature to distill off the water. When the distillation of the water is completed or essentially completed, the pressure is reduced and the temperature is increased up into the range of 200° to 240° C. Heating is continued, taking off volatile materials such as the glycol which is in excess and continuing to reduce the pressure. Towards the end of the reaction, the pressure is usually about 1 to 15 mm. of mercury.

The reaction of the acid, the glycol and the dibasic acids, may be accelerated by the use of a small amount of an acidic catalyst such as zinc chloride, sodium acid sulfate, and the like. Amounts may vary from about 0.1 to 1%. The reaction is preferably carried out in the absence of air, as in the presence of hydrogen or nitrogen.

The reaction may be carried out in the presence of a volatile solvent such as benzene, toluene and mixtures of naphthas and the like. Or the necessary reactants to form the polyester may comprise the initial reaction mixture. Or, if desired, the glycol and the dibasic acid in suitable proportions may be first reacted and then the polyester which is formed may be terminated by a suitable amount of terminating acids.

The polyesters of the invention are useful plasticizers for vinyl halide resins. The term "vinyl halide resin" refers herein to polymers containing a predominant quantity, that is, a quantity greater than 50%, generally over 60%, of the monomer as vinyl halide units. This includes the homopolymers of the vinyl halides as well as the copolymers and interpolymers prepared therefrom. Other monomers that may be copolymerized with the vinyl halide include the vinyl type monomers such as, for example, those having a single vinylidene or a vinyl group, such as vinylidene chloride, vinyl chloroacetate, chlorostyrene; chlorobutadienes, etc. Also of use are copolymers of such vinyl compounds and other unsaturated materials copolymerizable therewith, for example, copolymers of a vinyl halide, such as vinyl chloride, with such materials as vinylidene chloride, vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate, and the corresponding esters of methacrylic acid; vinyl aromatic compounds, for example, styrene; esters of $\alpha,\beta$-unsaturated carboxylic acids, for example, the methyl, ethyl-butyl, amyl, hexyl, octyl esters of maleic, crotonic, itaconic, fumaric acids and the like. Further useful copolymers are those obtained by copolymerization of vinyl chloride with an ester of an α,β-unsaturated dicarboxylic acid, such as diethyl maleate or other esters of maleic, fumaric, aconitic, itaconic acid, etc. in which 5 to 20 parts by weight of diethyl maleate or other analogous esters are used for every 95 to 80 parts by weight of vinyl chloride.

The esters of the invention are ordinarily incorporated into the vinyl halide polymers by mixing the powdered resin with the liquid plasticizer followed by mixing and/or kneading and then by curing the mix at an elevated temperature, for example, within the range from 150° to 200° C., on hot rolls or in a heated mixer, such as a Werner-Pfleider or Banbury mixer. The proportion of ester that may be employed may vary over a great range since it is dependent on the particular esters of this invention which are selected, the specific polyvinyl halide resin to be plasticized and the final degree of plasticization desired in the resin, this factor in itself being dependent on the ultimate application intended for the resin. With these facts in mind, one skilled in the art will use the esters in a "plasticizing amount," for most purposes this being from about 20 to 90 parts, and more specifically, from 30 to 60 parts, of ester per 100 parts of resin. In amounts less than 20 parts per 100 parts of resin, the effect of selected ester may be noted; in amounts exceeding 100 parts of ester per 100 parts of polyvinyl chloride resin, the esters of the invention are more commonly suitable for use in organosols and plastisols.

In accordance with the invention, there may be employed one or more esters of this invention in polyvinyl halide compositions; also, the esters of the invention may be employed in conjunction with conventional plasticizers, such as alkyl phthalates, alkyl phosphates, monomeric or polymeric epoxides, and other plasticizers known in the art. Optionally, the resinous compositions may have incorporated therewith various stabilizers, fillers, dyes, pigments, and the like.

The following examples illustrate the method for preparing these compounds; they are not intended to be construed as limiting the invention in spirit or in scope. Amounts are given in parts by weight.

Example 1

In a reaction vessel are mixed the following ingredients: 215.79 parts of saturated cocoanut oil fatty acids having an average carbon atom content of 13.5, 427.64 parts of 1,2-propylene glycol, 438 parts of adipic acid, 165.93 parts of isophthalic acid, 1.43 parts of zinc chloride. The mixture is heated at 200° C. for three hours, distilling off water. Heating is continued for an additional five hours at 200° C., reducing the pressure to 100 mm. Excess glycol is removed by further heating for 10 hours at 220° C. and reduced pressure of 1 to 2 mm. The product is cooled and filtered, collecting 978 parts of the polyester, 1,2-propylene adipate/isophthalate (75/25) having an $n$ value of 8. The hydroxy number of the product is nil; the acid number, 0.89, the saponification number 490, and the Gardner-Holdt viscosity is Z5+.

When 40 parts of this polyester are integrated into polyvinyl chloride, a supple and pliable resin is obtained and the plasticizer shows good permanence in the resin. The evaluation of the resin showed the following data:

TABLE I

| | |
|---|---|
| Shore "A" hardness | 78 |
| Activated carbon volatility (24 hrs. at 90° C.) | 0.7 |
| 1% soap extraction (24 hrs. at 90° C.) | 2.0 |
| n-Hexane extraction (2 hrs. at 25° C.) | 1.4 |
| Mineral oil extraction | 0.9 |
| 60° high humidity spew (days to definite spew) | 75 |
| Polystyrene marring (48 hrs. at 70° C.) | None |
| Migration into foam rubber (percent) 7 days/60° C./1/4 p.s.i. | 0.9 |

The data show the excellent resistance to high humidity spew and to marring of polystyrene.

A polyester made only from adipic acid, omitting isophthalic, shows definite spew in the polystyrene marring test. Under the high humidity test spewing was observed in 15 days for this polyester.

The same composition is prepared except that the homopolymer of vinyl chloride is replaced by a copolymer of 87 parts of vinyl chloride and 13 parts of vinyl acetate. A plasticized resin is obtained having similar high resistance to extraction and good compatibility.

Example 2

(a) The procedure of Example 1 is followed adjusting the ratio of the dibasic acids, adipic and isophthalic acids, to 80/20. The polyester is a useful plasticizer for polyvinyl chloride resins giving supple and pliable films.

(b) Part (a) is repeated to give a ratio of 60/40. A supple polyvinyl chloride resin results upon its incorporation therein.

(c) The resin is replaced by the following composition: 80 parts of vinyl chloride and 20 parts of vinylidene chloride.

Example 3

(a) The procedure of Example 1 is repeated, adjusting the proportion of terminating acid and dibasic acids to give an $n$ value of 7. Good resistance to extraction at high temperature in polyvinyl resin is shown by this polyester.

(b) Part (a) is repeated, giving an $n$ value of 12. The polyester shows good resistance to marring of polystyrene.

(c) A copolymer of 80 parts of vinyl chloride and 20 parts of methyl acrylate is plasticized with the same polyester giving a resin that is highly resistant to spewing under high humidity conditions.

Example 4

(a) The procedure of Example 1 is followed replacing the terminating acid mixture by palmitic acid and adjusting the ratio of dibasic acids, adipic and isophthalic acids, to 75/25. A solid polyester is obtained which shows excellent combination of resistance to marring of polystyrene and to spewing under conditions of high humidity.

(b) The polyvinyl chloride polymer of part (a) is replaced by 95 parts of vinyl chloride and 5 parts of vinyl isobutyl ether. The resin has high resistance to spewing under high humidity conditions.

The tests used to evaluate the plasticizers of this invention are standard tests which are fully described in the book "Plasticizers," Rohm & Haas Company, Philadelphia, Pa., pages 84 to 87 under "Processing Technique" and the tests which follow thereafter. The said tests are incorporated herein by reference.

I claim:

1. A resinous composition comprising a vinyl chloride polymer plasticized with a plasticizing amount of a polyester of the formula

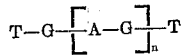

in which:
T is at least one saturated fatty acid residue having an average carbon atom content of 12 to 16,
G is 1,2-propylene glycol residue,
A is an organic dibasic acid residue derived from adipic and isophthalic acids in a ratio ranging from 85-60 and 15-40, respectively, and
$n$ has a value from about 7 to about 12.

2. A resinous composition comprising a vinyl chloride polymer plasticized with a plasticizing amount of the polyester of claim 1 in which the adipate/isophthalate ratio is 80/20.

3. A resinous composition comprising a vinyl chloride polymer plasticized with a plasticizing amount of the polyester of claim 1 in which the adipate/isophthalate ratio is 75/25, $n$ has a value of 8 and T has an average of 13.5 carbon atoms.

4. A resinous composition comprising a vinyl chloride polymer plasticized with a plasticizing amount of the polyester of claim 1 in which the polyester has an $n$ value of 10.

5. The composition of claim 4 in which the polyester has an $n$ value of 9.

6. The composition of claim 5 in which the ratio of adipate/isophthalate is 60/40.

References Cited

UNITED STATES PATENTS

| | | | |
|---|---|---|---|
| 3,284,399 | 11/1966 | Van Hook | 260—31.8 |
| 2,815,354 | 12/1957 | Wilkinson et al. | 260—23 |
| 2,838,428 | 6/1958 | Bohrer | 260—23 |
| 3,011,999 | 12/1961 | Parker et al. | 260—31.6 |
| 3,055,869 | 9/1962 | Wilson et al. | 260—75 |
| 3,194,776 | 7/1965 | Caldwell | 260—31.6 |
| 3,028,352 | 4/1962 | Hecker et al. | 260—31.6 |
| 3,330,789 | 7/1967 | Aylesworth et al. | 260—22 |
| 3,331,802 | 7/1967 | Huber et al. | 260—31.6 |
| 3,331,803 | 7/1967 | Blaschke | 260—31.6 |

OTHER REFERENCES

Oronite Chemical Co., Bulletin No. 10, April 1955, p. 2.

JAMES A. SEIDLECK, *Primary Examiner.*

LEON J. BRECOVITZ, *Examiner.*

R. A. WHITE, *Assistant Examiner.*